(12) United States Patent
Kumar et al.

(10) Patent No.: US 12,086,169 B2
(45) Date of Patent: Sep. 10, 2024

(54) COLLABORATIVE RESOLUTION FRAMEWORK

(71) Applicant: Dell Products L.P., Round Rock, TX (US)

(72) Inventors: Dhilip Kumar, Bangalore (IN); Ponnayan Sekar, Attibee (IN); Hung Dinh, Austin, TX (US); Bijan Kumar Mohanty, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 302 days.

(21) Appl. No.: 17/657,442

(22) Filed: Mar. 31, 2022

(65) Prior Publication Data

US 2023/0315764 A1    Oct. 5, 2023

(51) Int. Cl.
| | | |
|---|---|---|
| G06F 16/332 | (2019.01) | |
| G06F 40/20 | (2020.01) | |
| G06F 40/30 | (2020.01) | |
| G06N 20/20 | (2019.01) | |

(52) U.S. Cl.
CPC .......... G06F 16/3329 (2019.01); G06F 40/20 (2020.01); G06F 40/30 (2020.01); G06N 20/20 (2019.01)

(58) Field of Classification Search
CPC ...... G06F 16/3329; G06F 40/30; G06F 40/20; G06N 20/20

See application file for complete search history.

(56) References Cited

U.S. PATENT DOCUMENTS

| | | | | |
|---|---|---|---|---|
| 5,862,322 A | * | 1/1999 | Anglin | G06Q 10/10 |
| | | | | 714/57 |
| 2015/0178371 A1 | * | 6/2015 | Seth | G06F 40/117 |
| | | | | 707/755 |
| 2019/0132451 A1 | * | 5/2019 | Kannan | H04M 3/5235 |
| 2019/0138958 A1 | * | 5/2019 | Ranjit | G06Q 10/063114 |
| 2019/0220695 A1 | * | 7/2019 | Nefedov | G06F 16/285 |

* cited by examiner

*Primary Examiner* — Sonia L Gay
(74) *Attorney, Agent, or Firm* — Daly, Crowley, Mofford & Durkee, LLP

(57) ABSTRACT

A method including: generating a conversation flow signature based on a set of communication transcripts, each of the communication transcripts being associated with a support request for a product, each of the communication transcripts being a text transcript of a communication between a respective customer and a respective customer support agent; classifying the conversation flow signature into one of a plurality of categories, the conversation flow signature being classified by using a machine learning classifier that is trained based on customer support records, each of the plurality of categories corresponding to a respective set of steps for configuring or repairing the product; and outputting an indication of the respective set of steps that is associated with the category in which the conversation flow signature is classified.

18 Claims, 8 Drawing Sheets

| | | 252 |
|---|---|---|
| 302A | SUPPORT_TICKET_1 | TELEPHONE CALL TRANSCRIPT |
| 304A | SUPPORT_TICKET_2 | TELEPHONE CALL TRANSCRIPT |
| 304B | SUPPORT_TICKET_2 | CHAT SESSION TRANSCRIPT |
| 304C | SUPPORT_TICKET_2 | EMAIL TRANSCRIPT |

FIG. 3

| | | 254 |
|---|---|---|
| 402 | CATEGORY_1 | SET_OF_STEPS_1 |
| 402 | CATEGORY_2 | SET_OF_STEPS_2 |
| 402 | CATEGORY_3 | SET_OF_STEPS_3 |
| 402 | CATEGORY_4 | SET_OF_STEPS_4 |

FIG. 4

| | | 258 |
|---|---|---|
| 502A | PRODUCT_1 | CLASSIFIER_1 |
| 502B | PRODUCT_2 | CLASSIFIER_2 |
| 502C | PRODUCT_3, PRODUCT_4 | CLASSIFIER_3 |

FIG. 5

| | | 256 |
|---|---|---|
| 602 | CONVERSATION_FLOW_SIGNATURE_1 | LABEL_1 |
| 602 | CONVERSATION_FLOW_SIGNATURE_2 | LABEL_2 |
| 602 | CONVERSATION_FLOW_SIGNATURE_3 | LABEL_3 |
| 602 | CONVERSATION_FLOW_SIGNATURE_4 | LABEL_4 |

FIG. 6

COLLABORATIVE RESOLUTION FRAMEWORK

BACKGROUND

Customer support roles tend to be fast-paced and intellectually demanding. To master a customer support role, a person or team may need a well-maintained workflow and high subject matter expertise. Maintaining high subject matter expertise may be particularly challenging as customer support agents often leave their organization or move within the organization. To minimize the effects of employee turnover, organizations customarily maintain detailed documentation of past customer service requests and the steps taken to resolve the requests. Such documentation is used as a reference when efforts are made to resolve pending customer service requests.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

According to aspects of the disclosure, a method is provided comprising: generating a conversation flow signature based on a set of communication transcripts, each of the communication transcripts being associated with a support request for a product, each of the communication transcripts being a text transcript of a communication between a respective customer and a respective customer support agent; classifying the conversation flow signature into one of a plurality of categories, the conversation flow signature being classified by using a machine learning classifier that is trained based on customer support records, each of the plurality of categories corresponding to a respective set of steps for configuring or repairing the product; and outputting an indication of the respective set of steps that is associated with the category in which the conversation flow signature is classified.

According to aspects of the disclosure, a system is provided, comprising: a memory; and at least one processor operatively coupled to the memory, the at least one processor being configured to perform the operations of: generating a conversation flow signature based on a set of communication transcripts, each of the communication transcripts being associated with a support request for a product, each of the communication transcripts being a text transcript of a communication between a respective customer and a respective customer support agent; classifying the conversation flow signature into one of a plurality of categories, the conversation flow signature being classified by using a machine learning classifier that is trained based on customer support records, each of the plurality of categories corresponding to a respective set of steps for configuring or repairing the product; and outputting an indication of the respective set of steps that is associated with the category in which the conversation flow signature is classified.

According to aspects of the disclosure, a non-transitory computer-readable medium is provided that stores one or more processor-executable instructions, which, when executed by at least one processor, cause the at least one processor to perform the operations of: generating a conversation flow signature based on a set of communication transcripts, each of the communication transcripts being associated with a support request for a product, each of the communication transcripts being a text transcript of a communication between a respective customer and a respective customer support agent; classifying the conversation flow signature into one of a plurality of categories, the conversation flow signature being classified by using a machine learning classifier that is trained based on customer support records, each of the plurality of categories corresponding to a respective set of steps for configuring or repairing the product; and outputting an indication of the respective set of steps that is associated with the category in which the conversation flow signature is classified.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

FIG. 3 is a diagram of an example of a transcript database, according to aspects of the disclosure;

FIG. 4 is a diagram of an example of an expert repository, according to aspects of the disclosure;

FIG. 5 is a diagram of an example of a classifier database, according to aspects of the disclosure;

FIG. 6 is a diagram of an example of a training database, according to aspects of the disclosure;

DETAILED DESCRIPTION

Figure 1:
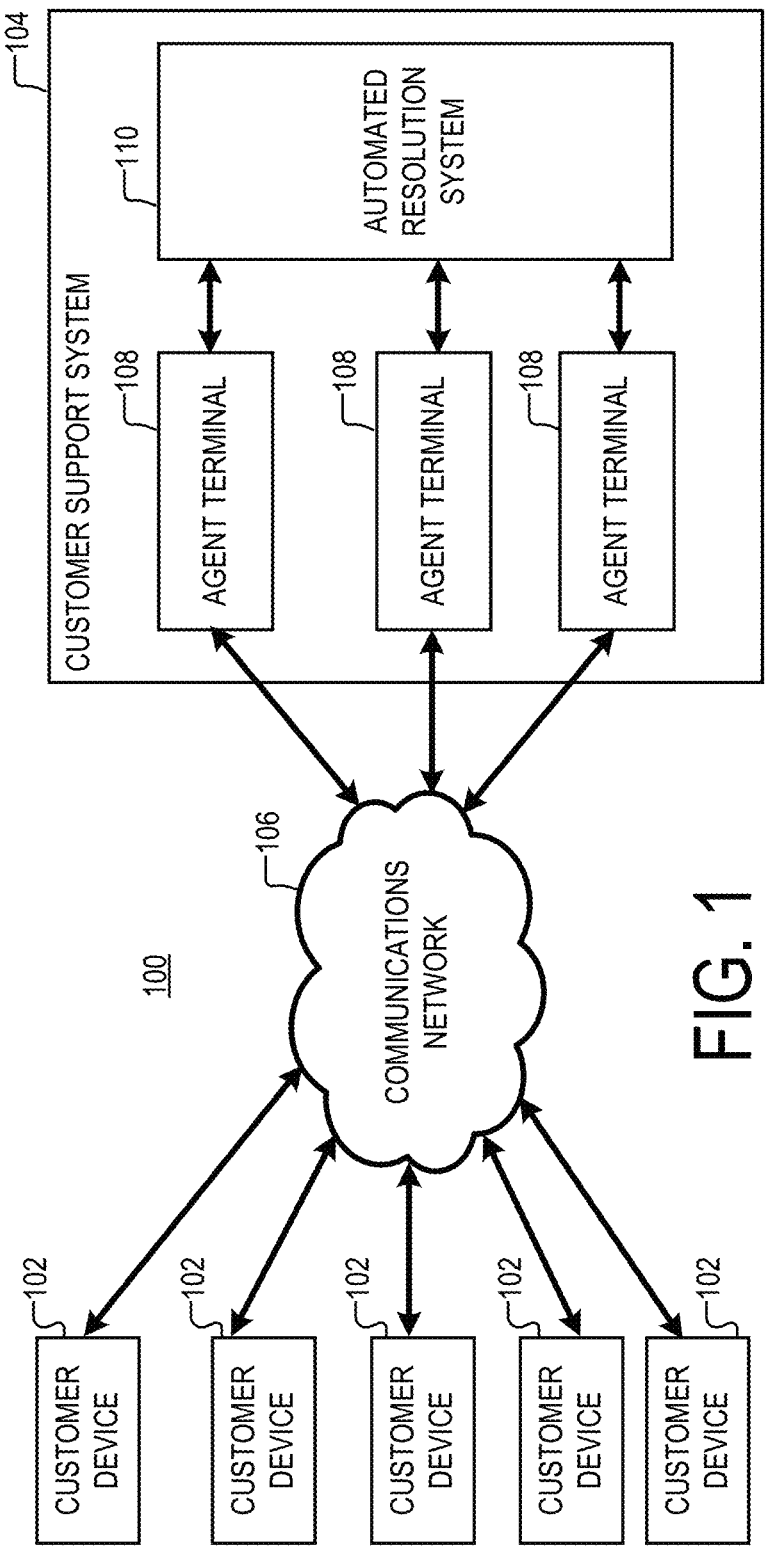
FIG. 1 is a diagram of an example of a system, according to aspects of the disclosure.

FIG. 1 is a diagram of an example of a system 100, according to aspects of the disclosure. As illustrated, the system 100 may include one or more customer devices 102 that are coupled to a customer support system 104, via a communications network 106. The communications network 106 may include one or more of a local area network (LAN), a wide area network (WAN), a cellular network (e.g., a 5G network), the Public Switched Telephone Network (PTSN), the Internet, and/or any other suitable type of communications network. Each of the customer devices 102 may include a desktop computer, a smartphone, a laptop, a telephone receiver, and/or any other suitable type of computing and/or communications device.

The customer support system 104 may include one or more agent terminals 108 and an automated resolution system 110. Each of the agent terminals 108 may include a desktop computer, a smartphone, a laptop, a telephone receiver, and/or any other suitable type of computing and/or communications device. In some implementations, each of the agent terminals 108 may be implemented as a computing device, such as the computing device 1200, which is discussed further below with respect to FIG. 12. The system 110 may be a system that is configured to automatically resolve customer support requests. According to the example of FIG. 1, the system 110 is executed on one or more computing devices that are separate from the agent terminals 108. In some implementations, each of the computing devices may be the same or similar to the computing device 1200, which is discussed further below with respect to FIG. 12. However, alternative implementations are possible in which the automated resolution system (or part of it) is executed directly on one or more of the agent terminals 108. Stated succinctly, the present disclosure is not limited to any specific implementation of the system 110. The operation of the system 110 is discussed further below with respect to FIGS. 2-11.

The customer support system 104 may be used for servicing customer support requests for a product. According to the present example, the product is a software product. However, alternative implementations are possible in which the product is a mechanical device, an article of manufacture, an electromechanical device, an electronic device, and/or any other suitable type of product.

A customer support request that is serviced by the customer support system 104 may be any request from a customer to resolve a problem with a product. The problem may be a malfunction of the product or one that arises from the customer's inability to use the product. The customer support request may be associated with a support ticket identifier and one or more communications between a customer and a customer support agent. The support ticket identifier may include any identifier that is used to track the customer support request. As discussed further below, the support ticket identifier may be used as a key for storing information about the customer support request in various databases.

The term "customer support agent" as used herein shall refer to any person who is communicating with a customer in an attempt to resolve a customer support request, irrespective of the job title of that person or affiliation of that person with a particular company or subdivision of a company. As is discussed further below, a support ticket identifier may be associated with a set of transcripts between a respective customer and a respective customer agent. The set of transcripts may include only one transcript or a plurality of transcripts. When the set includes a plurality of transcripts of communications between a respective customer and a respective agent, the communications may be between different representatives of the customer and different agents or the same person and the same agent. In other words, as used throughout the disclosure, the phrase "a set of communication transcripts, each of the communication transcripts being associated with a support request for a product, each of the communication transcripts being a text transcript of a communication between a respective customer and a respective customer support agent" does not necessarily imply that all communications are performed by the same person on the customer side and/or the same person on the agent side.

As used throughout the disclosure, the term "communication" may refer to one or more of a voice call between a customer and an agent, a voice message by a customer or an agent, a video call between a customer or an agent, a video message by a customer or an agent, an email message (from a customer or an agent), an email thread containing emails by a customer and emails by an agent), a message that is generated by a customer during a chat session, a set of messages (e.g., all messages) that are generated during a chat session between a customer or a session, and/or any other suitable type of communication. A text transcript of a communication may include one or more of a text transcript of a telephone call or a voice message, a text transcript of a video call or a video message, the text of an email, the text of a set of emails, the text of a chat message, the text of a text message or a set of text messages, etc. The use of the word "transcript" in the phrase "text transcript of a communication" does not necessarily imply the performance of a transcription step after the communication is generated. For example, when the communication is a text communication, such as a chat message or an email message, the text transcript of the communication may be the communication itself.

Figure 2:
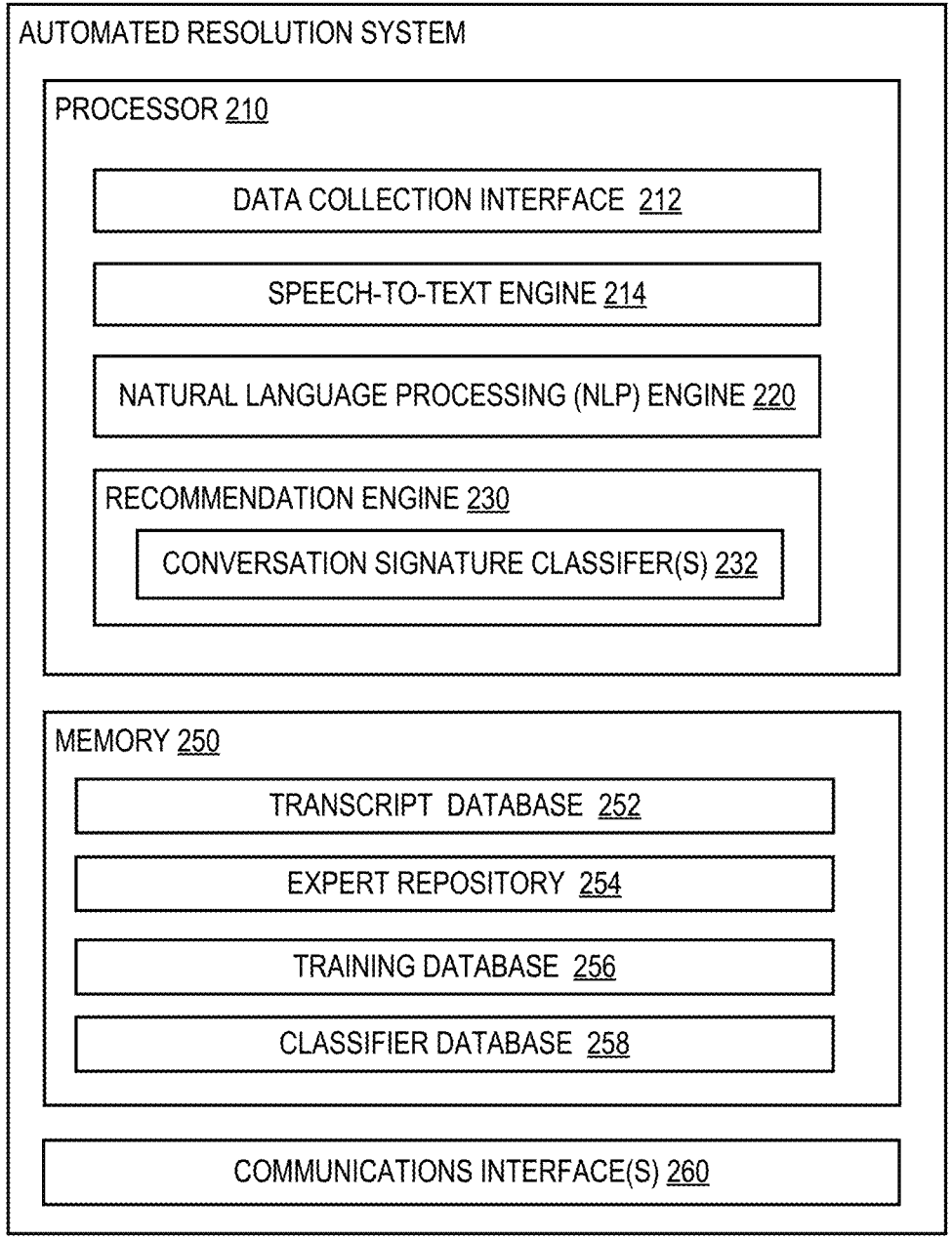
FIG. 2 is a diagram of an automated resolution system, according to aspects of the disclosure.

FIG. 2 is a diagram of the automated resolution system 110, according to aspects of the disclosure. The system 110 may include a processor 210, a memory 250, and a communications interface 260. The processor 210 may include any of one or more general-purpose processors (e.g., x86 processors, RISC processors, ARM-based processors, etc.), one or more Field Programmable Gate Arrays (FPGAs), one or more application-specific circuits (ASICs), and/or any other suitable type of processing circuitry. The memory 250 may include any suitable type of volatile and/or non-volatile memory. In some implementations, the memory 250 may include one or more of a random-access memory (RAM), a dynamic random memory (DRAM), a flash memory, a hard drive (HD), a solid-state drive (SSD), a network accessible storage (NAS), and or any other suitable type of memory device. The communications interface 260 may include any suitable type of communications interface, such as one or more Ethernet adapters, one or more Wi-Fi adapters (e.g., 802.1414 adapters), and one or more Long-Term Evolution (LTE) adapters, for example.

The processor 210 may be configured to execute a data collection interface 212, a speech-to-text engine 214, a natural language processing (NLP) engine 220, and a recommendation engine 230. In the example of FIG. 2, each of the data collection interface 212, the speech-to-text engine 214, the NLP engine 220, and the recommendation engine 230 is implemented in software. However, alternative implementations are possible in which any of the data collection interface 212, the speech-to-text engine 214, the NLP engine 220, and the recommendation engine 230 is implemented in hardware or as a combination of software and hardware.

The data collection interface 212 may be configured to intercept or otherwise obtain communications between any of the agent terminals 108 and any of the customer devices 102. The data collection interface 212 may be configured to record text transcripts of the communications in the transcript database 252. The intercepted communications may include telephone calls, video calls, email messages, chat messages (e.g., messages that are exchanged in a text chat session between a customer and a technical support agent, etc.), voicemail messages, video messages, and/or any other suitable type of communications. When non-text communications, such as voice calls or video calls, are obtained, the data collection interface 212 may process the audio data for the communications with the speech-to-text engine 214 to obtain text transcripts of the communications.

The NLP engine 220 may be configured to generate a conversation flow signature for a particular customer support ticket. The conversation flow signature may be generated based on the text transcripts of communications that are associated with the customer support ticket. The conversation flow signature may identify one or more topics that are discussed during different communications that are associated with the customer support request. Examples of "topics" that are discussed in one or more text transcripts may include (i) an identifier of the product that a customer is having a problem with, (ii) an identifier of the type of the problem, (iii) an identifier of the state of the system when the product is experiencing the problem, (iv) an identifier of a possible cause of the problem that was considered by a customer and/or customer support agent in any of the text transcripts. Additionally or alternatively, in some implementations, the conversation flow signature may identify the order in which topics are discussed in a particular text transcript or over the course of an entire set of communications. Examples of information that can be contained in a conversation flow signature are discussed further below with respect to FIGS. 7-9.

In some implementations, the NLP engine 220 may be a Natural Language Processing (NLP) engine, and it may employ any suitable type of NLP technology for topic or context detection. Additionally or alternatively, in some implementations, the engine may employ any suitable type of NLP technology for extracting information from unstructured text. In some implementations, the NLP engine 220 may use topic-tagging to identify any information item that is part of a conversation flow signature. The topic-tagging may be performed by using Latent Dirichlet Allocation (LDA) and/or any other suitable type of technique for topic-tagging.

The recommendation engine 230 may implement one or more classifiers 232. The recommendation engine 230 may execute any of the classifiers 232 to classify a conversation flow signature (generated by the NLP engine 220). As a result of executing any of the classifiers 232 based on a conversation flow signature, the recommendation engine 230 may classify the conversation flow signature into one of a plurality of categories. Each of the plurality of categories may correspond to a different set of steps for resolving a customer support request. A set of steps for resolving a customer support request may include at least a portion of a text file (or at least a portion of an object or another construct) that identifies a set (e.g., a sequence or an unordered set) of actions that are considered likely to resolve a problem which is the subject of the customer support request. For example, a set of steps may have the format of: {"perform action 1", "perform action 2", and "perform action 3"}. In some implementations, any of the classifiers may include a Random Forest classifier. However, alternative implementations are possible in which any of the classifiers 232 includes a neural network and/or any other suitable type of classifier. In some implementations, any of the classifiers 232 may be trained using supervised learning, based on training data such as the training data that is discussed further below with respect to FIG. 6. It will be understood that the present disclosure is not limited to any specific type of training data or method for training the classifiers 232.

The memory 250 may be configured to store a transcript database 252, an expert repository 254, a training database 256, and a classifier database 258. The databases 252-258 are discussed in further detail with respect to FIGS. 3-6. As used herein, the term "database" refers to one or more files or data structures that are used to store information. Although the databases 252-258 are depicted as tables in FIGS. 3-6, it will be understood that the present disclosure is not limited to any specific implementation or architecture for the databases 252-258. Although in the example of FIG. 2 the databases 252-258 are hosted internally on the system 110, alternative implementations are possible in which any of the databases 252-258 are hosted on an external device.

FIG. 3 is a diagram of an example of the transcript database 252, according to aspects of the disclosure. As illustrated, the transcript database 252 may include entries 302A and 304A-C. Entry 302A may map a first support ticket identifier to the transcript of a telephone call between a first customer and an agent. Entry 304A may map a second support ticket identifier to the transcript of a telephone call between a second customer and an agent. Entry 304B may map the second support ticket identifier to the transcript of a chat session between the second customer and an agent. And entry 304C may map the second support ticket identifier to the transcript of an email from the second customer to an agent. In operation, the transcript database 252 may be used by the system 110 to identify a set of communication transcripts that are associated with a particular support ticket identifier, when the system 110 wants to generate a conversation flow signature for the support ticket identifier. FIG. 3 illustrates that when the same customer support request (or the same support ticket identifier) involves repeated communications between a customer and an agent, the transcript database 252 may contain text transcripts for all (or more than one) of the communications. In some implementations, any of the transcripts that are stored in the database 252 may include unstructured text.

FIG. 4 is a diagram of an example of the expert repository 254, according to aspects of the disclosure. As illustrated, the expert repository 254 may include a plurality of entries 402. Each of the entries 402 may be configured to map a respective one of a plurality of categories to a different respective set of steps. In operation, the expert repository 254 may be used by the system 110 to identify the set of steps associated with a particular category when a conversation signature is classified into the particular category by one of the classifiers 232. FIG. 4 is provided as an example only, and the present disclosure is not limited to any specific method for mapping categories to respective sets of steps.

FIG. 5 is a diagram of an example of a classifier database 258, according to aspects of the disclosure. As illustrated, the database 258 may include entries 502A-C. Entry 502A is configured to map the identifier of a first product to an identifier of a first one of the classifiers 232. The first classifier 232 may be configured to classify a conversation flow signature into one of a plurality of categories. Each of the categories may correspond to a respective set of steps for resolving problems with the first product. In some implementations, the first classifier 232 may be trained based on customer support records for the first product. Entry 502B is configured to map the identifier of a second product to an identifier of a second one of the classifiers 232. The second classifier 232 may be configured to classify a conversation flow signature into one of a plurality of categories. Each of the categories may correspond to a respective set of steps for resolving problems with the second product. In some implementations, the second classifier 232 may be trained based on customer support records for the second product. Entry 502C is configured to map the identifiers of a third product and a fourth product to the identifier of a third classifier 232. The third classifier 232 may be configured to classify a conversation flow signature into one of a plurality of categories. Each of the categories may correspond to a respective set of steps for resolving problems with the third and/or fourth products. In some implementations, the third classifier 232 may be trained based on training data that is associated with the third and/or fourth products.

FIG. 6 is a diagram of an example of a training database 256, according to aspects of the disclosure. As illustrated, the training database 256 may include a plurality of entries 602. Each of the entries 602 may be configured to map a different one of a plurality of conversation flow signatures to a respective one of a plurality of labels. Each of the entries 602 may be used to train one or more of the classifiers 232. Each of the entries 602 may be generated based on a customer support record. The customer support record may include: (i) one or more text transcripts that discuss a problem with a product and (ii) a set of steps that constitute a solution to the problem. The customer support record may be a historical record that is generated based on data associated with a real customer support request that was received earlier by the customer support system 104 or it may be generated synthetically, for the purposes of training one of the classifiers 232. Each entry 602 may include a conversation flow signature that is generated based on communications transcripts that are part of a respective customer support record and a label identifying a set of steps provided by the same customer support record.

Figure 7:
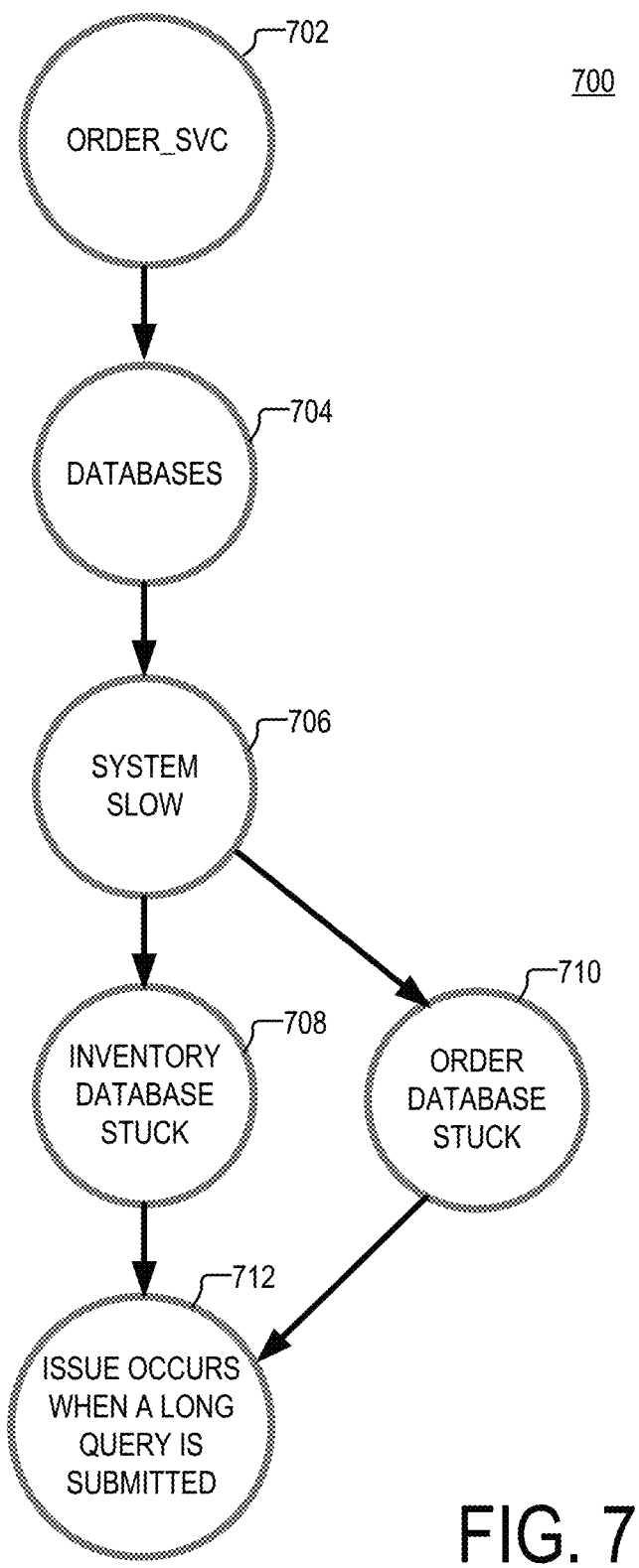
FIG. 7 shows an example of a graph representing a conversation flow signature, according to aspects of the disclosure.

FIG. 7 shows a graph representation of a conversation flow signature 700, according to aspects of the disclosure. According to the example of FIG. 7, the conversation flow signature 700 models information that is provided by a customer as part of a customer support request aimed at resolving a problem the customer is having with a product. The information may be provided during one or more communications between the customer and a support agent.

The conversation flow signature 700 may be generated based on one or more communication transcripts that are associated with the customer support request. The conversation flow signature 700 may include a plurality of information items that are represented by nodes 702-712, respectively. Node 702 may include the identifier of the product. In the example of FIG. 7, the product is a software system for order fulfillment. Node 704 may include an identifier of a problem domain. In the present example, node 704 indicates that the customer support inquiry pertains to resolving a problem with one of the databases that are used by the product. Node 706 includes an identifier of a product behavior that is discussed (in the transcripts) as being part of the problem. In the present example, node 706 indicates that the software system is being slow. Node 708 includes an identifier of another behavior of the product that is discussed (in the transcripts) as being part of the problem. In the present example, node 708 indicates that an inventory database becomes stuck. Node 710 includes an identifier of yet another behavior of the product that is discussed (in the transcripts) as being part of the problem. In the present example, node 710 indicates that an order database becomes stuck. In some instances, the information in each of nodes 708 and 710 may be extracted from different communication transcripts. Node 712 includes an identifier of a suspected trigger for the behaviors identified by nodes 706-710. Node 712 indicates that the customer has reported that the behaviors identified by nodes 706-710 occur when a long query is submitted to one of the inventory and order databases. In the example of FIG. 7, the edges leading into node 712 indicate that the behaviors of nodes 708 and 710 are potentially caused or triggered by the cause/trigger of node 712. In the example of FIG. 7, the edges connecting node 706 to nodes 708 and 710 indicate that the behaviors of nodes 708 and 710 are subspecies of the behavior of node 706.

Figure 8:
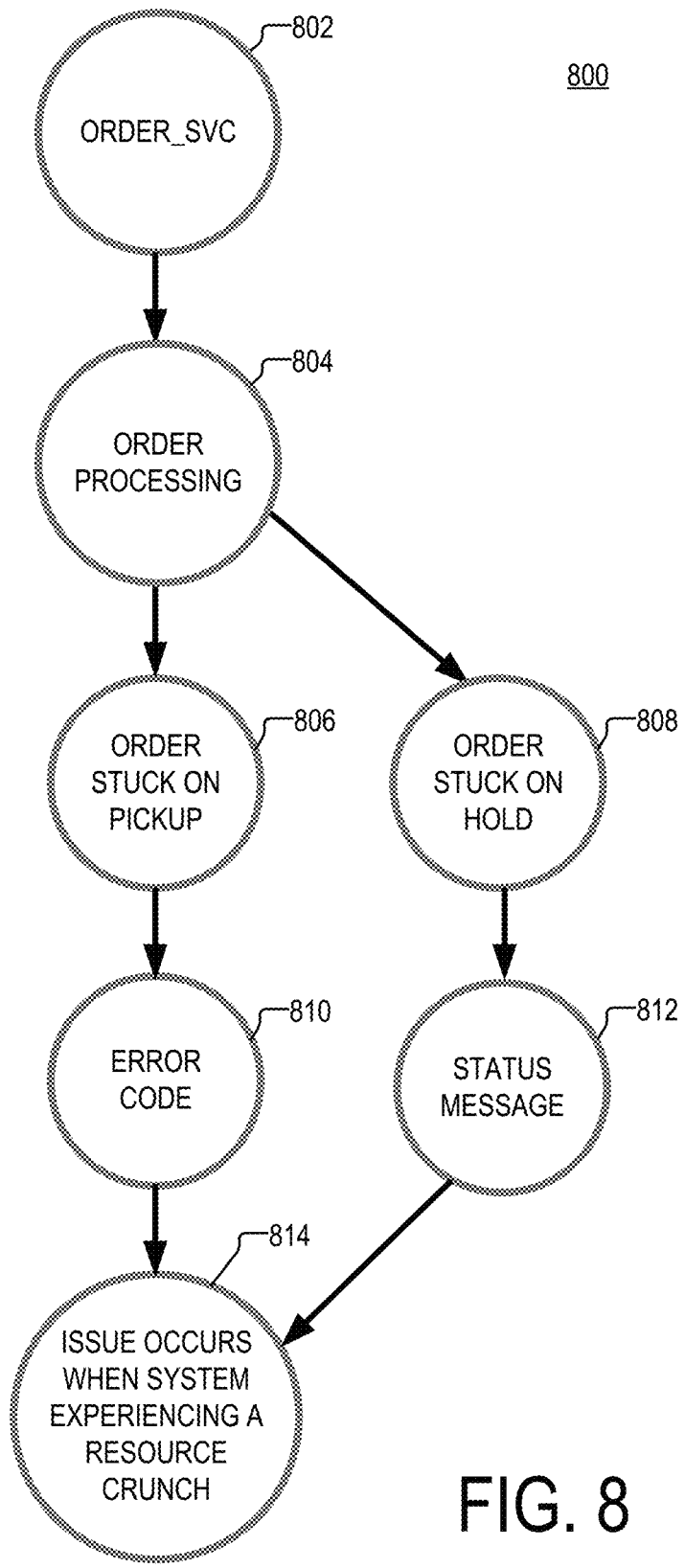
FIG. 8 shows an example of a graph representing a conversation flow signature, according to aspects of the disclosure.

FIG. 8 shows a graph representation of a conversation flow signature 800, according to aspects of the disclosure. According to the example of FIG. 8, the conversation flow signature 800 models information that is provided by a customer as part of a customer support request aimed at resolving a problem the customer is having with a product. The information may be provided during one or more communications between the customer and a support agent.

The conversation flow signature 800 may be generated based on one or more communication transcripts that are associated with the customer support request. The conversation flow signature 800 may include a plurality of information items that are represented by nodes 802-814, respectively. Node 802 may include the identifier of the product. In the example of FIG. 8, the product is a software system for order fulfillment. Node 804 may include an identifier of a problem domain. In the present example, node 804 indicates that the customer support inquiry pertains to resolving a problem with the processing of orders. Node 806 includes an identifier of a product behavior that is discussed (in the transcripts) as being part of the problem. In the present example, node 806 indicates that orders become stuck on pickup. Node 808 includes an identifier of another behavior of the product that is discussed (in the transcripts) as being part of the problem. In the present example, node 808 indicates that orders become stuck on hold. Node 810 includes an error code that is generated by the product when the product exhibits the behavior identified by the node 806. Node 812 includes a status message that is generated by the product when the product exhibits the behavior identified by the node 808. Node 814 identifies what was discussed (in the transcripts) as a possible cause or trigger for the behaviors identified by nodes 806 and 808.

The edge connecting nodes 806 and 810 indicates that the error code of node 810 is generated when the behavior of node 806 is manifested. The edge connecting nodes 808 and 812 indicates that the status of node 812 is generated when the behavior of node 808 is manifested. The edges leading into node 814 indicate that the behaviors of nodes 808 and 806 are potentially caused or triggered by the cause/trigger of node 814.

Figure 9:
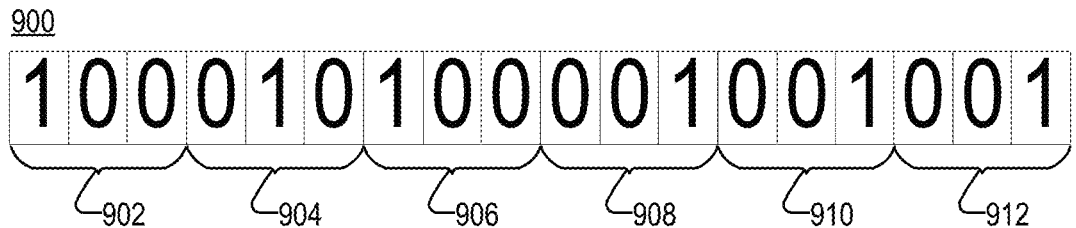
FIG. 9 shows an example of a conversation flow signature, according to aspects of the disclosure.

FIG. 9 is a diagram of a binary string 900 that encodes the conversation flow signature 700 (shown in FIG. 7). Although in the example of FIG. 9, the binary string 900 does not encode the information represented by the edges of the graph of FIG. 7, alternative implementations are possible in which this information is also encoded in the binary string 900. The binary string 900 may be used as input to one of the classifiers 232 (shown in FIG. 2). The binary string 900 may include portions 902-912.

Portion 902 may identify the product that is associated with the conversation flow signature 700. Portion 902 may include a plurality of bits. Each bit may be associated with a different respective product. When a given bit in portion 902 is set to 1, this is an indication that the bit's associated product is associated with the conversation flow signature 700. On the other hand, when a given bit in portion 902 is set to 0, this is an indication that the bit's associated product is not associated with the conversation flow signature 700. According to the present example, portion 902 encodes the information represented by node 702 (shown in FIG. 7).

Portion 904 may identify a problem domain. Portion 904 may include a plurality of bits. Each bit may be associated with a different respective problem domain. When a given bit in portion 904 is set to 1, this is an indication that the bit's associated problem domain is represented by portion 904. When a given bit in portion 904 is set to 0, this is an indication that the bit's associated problem domain is not represented by portion 904. According to the present example, portion 904 encodes the information represented by node 704 (shown in FIG. 7).

Portion 906 may identify a product behavior. Portion 906 may include a plurality of bits. Each bit may be associated with a different respective product behavior. When a given bit in portion 906 is set to 1, this is an indication that the bit's associated product behavior is represented by portion 906. On the other hand, when a given bit in portion 906 is set to 0, this is an indication that the bit's associated product behavior is not represented by portion 906. According to the present example, portion 906 encodes the information represented by node 706 (shown in FIG. 7).

Portion 908 may identify a product behavior. Portion 908 may include a plurality of bits. Each bit may be associated with a different respective product behavior. When a given bit in portion 908 is set to 1, this is an indication that the bit's associated product behavior is represented by portion 908. On the other hand, when a given bit in portion 908 is set to 0, this is an indication that the bit's associated product behavior is not represented by portion 908. According to the present example, portion 908 encodes the information represented by node 708 (shown in FIG. 7).

Portion 910 may identify a product behavior. Portion 910 may include a plurality of bits. Each bit may be associated with a different respective product behavior. When a given bit in portion 910 is set to 1, this is an indication that the bit's associated product behavior is represented by portion 910. On the other hand, when a given bit in portion 910 is set to 0, this is an indication that the bit's associated product behavior is not represented by portion 910. According to the present example, portion 910 encodes the information represented by node 710 (shown in FIG. 7).

Portion 912 may identify what is discussed (by a customer and/or a customer support agent) as the cause or trigger of the behaviors identified by portions 906-910. Portion 912 may include a plurality of bits. Each bit may be associated with a different respective cause or trigger. When a given bit in portion 912 is set to 1, this is an indication that the bit's respective cause or trigger is represented by portion 912. On the other hand, when a given bit in portion 912 is set to 0, this is an indication that the bit's respective cause or trigger is not represented. According to the present example, portion 912 encodes the information represented by node 712 (shown in FIG. 7).

FIGS. 7-9 are provided as an example only. FIGS. 7-8 are provided to illustrate the types of information that can be encoded in a conversation flow signature. The examples of FIGS. 7-8 are not mutually exclusive, and the present disclosure is not limited only to the information shown in FIGS. 7-8 being encoded in a conversation flow signature. FIG. 9 is provided as an example only to illustrate how one might programmatically represent a conversation flow signature. The present disclosure is not limited to any specific encoding or format of conversation flow signatures.

Figure 10:
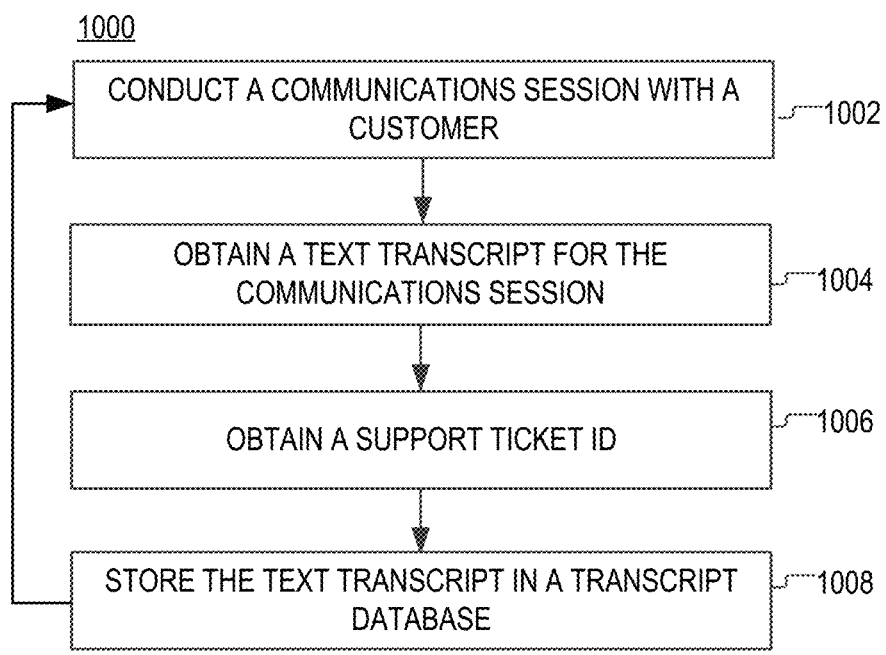
FIG. 10 is a flowchart of an example of a process, according to aspects of the disclosure.

FIG. 10 is a flowchart of an example of a process 1000, according to aspects of the disclosure. At step 1002, a communication session is conducted between a customer and a customer support agent. At step 1004, a text transcript of the communication is obtained by the data collection interface 212. At step 1006, a support ticket identifier is obtained by the data collection interface 212. The support ticket identifier may be associated with the communication (conducted at step 1002). At step 1008, the text transcript (obtained at step 1004) is stored in the transcript database 252 by the data collection interface 212. The text transcript is keyed, in the transcript database 252, to the support ticket identifier (obtained at step 1006).

Figure 11:
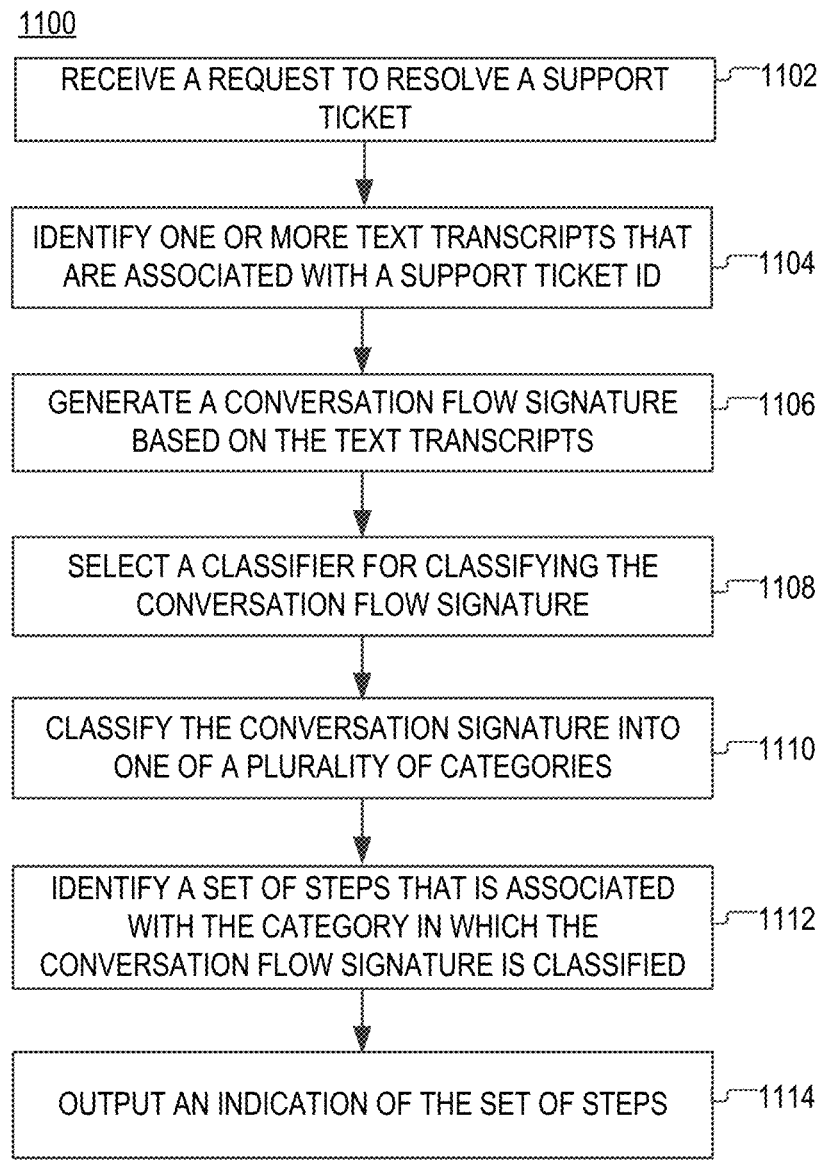
FIG. 11 is a flowchart of an example of a process, according to aspects of the disclosure.

FIG. 11 is a flowchart of an example of a process 1100, according to aspects of the disclosure. In the example of FIG. 11, the process 1100 is performed by the system 110. However, the present disclosure is not limited to any specific entity executing the process 1100.

At step 1102, the system 110 receives a request to resolve a customer support ticket. According to the present example, the request includes a support ticket identifier that is associated with a customer support request and a product identifier corresponding to the product with which the customer support request is associated. According to the example of FIG. 11, the request is received from one of the agent terminals 108.

At step 1104, the system 110 identifies one or more text transcripts that are associated with the customer support request. According to the present example, the text transcripts are retrieved from the transcript database 252 based on the support ticket identifier (received at step 1102).

At step 1106, the system 110 generates a conversation flow signature based on the transcripts (retrieved at step 1104). The conversation flow signature may be generated by using the NLP engine 220.

At step 1108, the system 110 selects one of the classifiers 232 for use in classifying the conversation flow signature (generated at step 1106). In some implementations, selecting the classifier 232 may include performing a search of the database 258 (shown FIG. 5) based on the product identifier (received at step 1102). As a result of the search, the system 110 may obtain an identifier of one of the classifiers 232 that is returned by the database 258.

At step 1110, the system 110 classifies the conversation flow signature (generated at step 1106) into one of a plurality of categories. The classification may be performed by using the classifier selected at step 1108.

At step 1112, the system 110 identifies a set of steps, which is associated with the category (identified at step 1110). In some implementations, the set of steps may be identified by performing a search of the expert repository 254 based on an identifier of the category.

At step 1114, the system 110 outputs an indication of the set of steps (identified at step 1112). According to the present example, outputting the indication of the set of steps includes transmitting the indication of the set of steps to the agent terminal 108, from which the request is received at step 1102. However, alternative implementations are possible in which outputting the set of steps includes displaying the indication on a display, storing the indication of the set of steps in a predetermined memory location, transmitting the indication over a communications network, rendering the indication on an audio device, etc.

Figure 12:
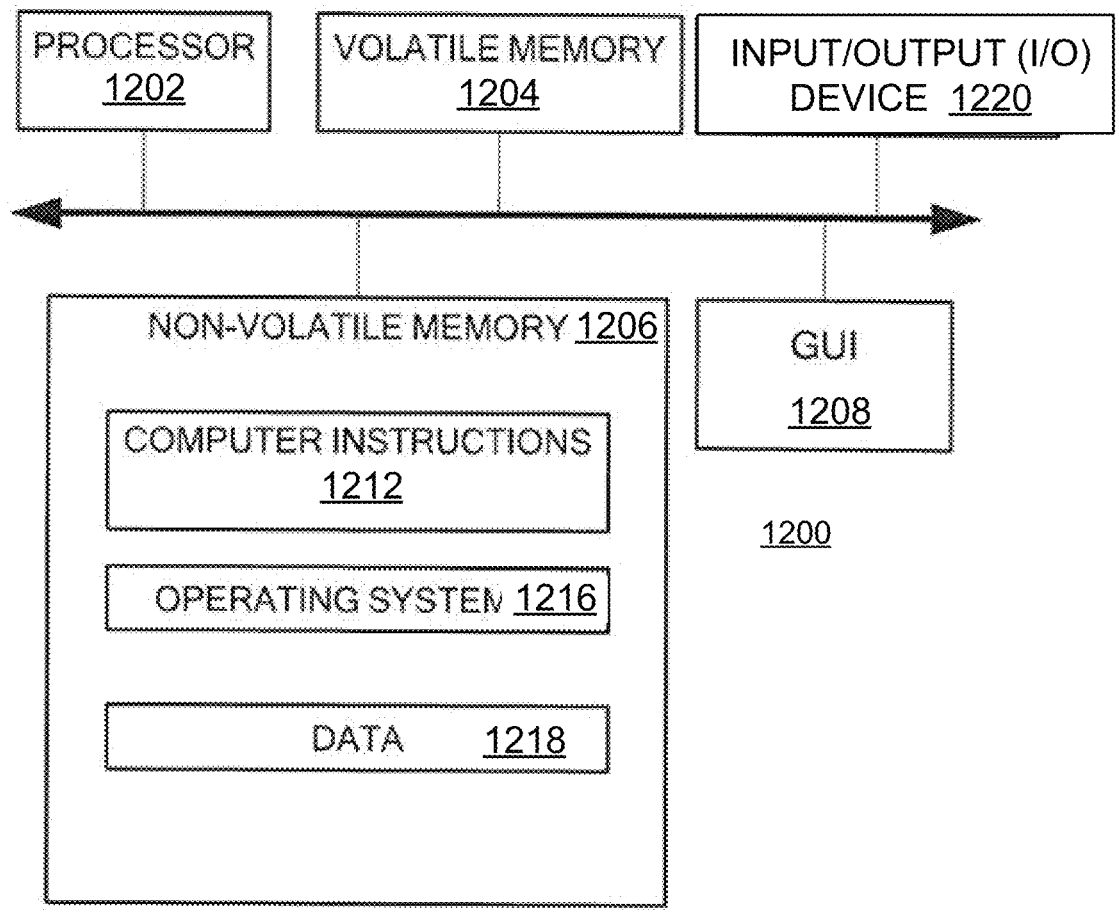
FIG. 12 is a diagram of an example of a computing device, according to aspects of the disclosure.

Referring to FIG. 12, computing device 1200 may include processor 1202, volatile memory 1204 (e.g., RAM), non-volatile memory 1206 (e.g., a hard disk drive, a solid-state drive such as a flash drive, a hybrid magnetic and solid-state drive, etc.), graphical user interface (GUI) 1208 (e.g., a touchscreen, a display, and so forth) and input/output (I/O) device 1220 (e.g., a mouse, a keyboard, etc.). Non-volatile memory 1206 stores computer instructions 1212, an operating system 1216 and data 1218 such that, for example, the computer instructions 1212 are executed by the processor 1202 out of volatile memory 1204. Program code may be applied to data entered using an input device of GUI 1208 or received from 110 device 1220.

Processor 1202 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard-coded into the electronic circuit or soft coded by way of instructions held in a memory device. A "processor" may perform the function, operation, or sequence of operations using digital values or using analog signals. In some embodiments, the "processor" can be embodied in an application-specific integrated circuit (ASIC). In some embodiments, the "processor" may be embodied in a microprocessor with associated program memory. In some embodiments, the "processor" may be embodied in a discrete electronic circuit. The "processor" may be analog, digital or mixed-signal. In some embodiments, the "processor" may be one or more physical processors or one or more "virtual" (e.g., remotely located or "cloud") processors.

The term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid-state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method comprising:
generating a conversation flow signature based on a set of communication transcripts, each of the communication transcripts being associated with a support request for a product, each of the communication transcripts being a text transcript of a communication between a respective customer and a respective customer support agent;

classifying the conversation flow signature into one of a plurality of categories, the conversation flow signature being classified by using a machine learning classifier that is trained based on customer support records, each of the plurality of categories corresponding to a respective set of steps for configuring or repairing the product; and outputting an indication of the respective set of steps that is associated with the category in which the conversation flow signature is classified, wherein the conversation flow signature encodes a graph having a first node that corresponds to a problem domain, a second node that corresponds to a behavior of the product, and at least one edge that leads into the second node, the edge being indicative of a potential cause of the behavior of the product.

2. The method of claim 1, wherein the conversation flow signature is generated by performing Natural Language Processing (NLP) on the set of communications transcripts, and the conversation flow signature identifies a plurality of topics that are discussed in the set of communication transcripts.

3. The method of claim 1, wherein the conversation flow signature is generated by performing Natural Language Processing (NLP) on the set of communications transcripts, and the conversation flow signature identifies a state of the product when a problem belonging to the problem domain is experienced by the product.

4. The method of claim 1, wherein the customer support records are based on:
(i) text transcripts of past communications that are associated with past customer support requests, and (ii) records of steps that were recommended to resolve the past customer support requests.

5. The method of claim 1, further comprising selecting the machine learning classifier out of a plurality of available machine learning classifiers, wherein the machine learning classifier is selected by performing a search of the plurality of available machine learning classifiers based on an identifier corresponding to the product.

6. The method of claim 1, wherein the machine learning classifier includes at least one of a random forest classifier and/or a neural network.

7. The method of claim 1, wherein the product includes one or more of a computing system, software, a mechanical device, an electronic device, an article of manufacture, and/or an electromechanical device.

8. The method of claim 1, wherein the set of communication transcripts includes one or more communication transcripts, and any of the communications transcripts includes one of a telephone call transcript, a video call transcript, text messages that are transmitted during a chat session, a text of an email, a text of an email thread, a voice message transcript, or a video message transcript.

9. A system, comprising:
a memory; and
at least one processor operatively coupled to the memory, the at least one processor being configured to perform the operations of:
generating a conversation flow signature based on a set of communication transcripts, each of the communication transcripts being associated with a support request for a product, each of the communication transcripts being a text transcript of a communication between a respective customer and a respective customer support agent;

classifying the conversation flow signature into one of a plurality of categories, the conversation flow signature being classified by using a machine learning classifier that is trained based on customer support records, each of the plurality of categories corresponding to a respective set of steps for configuring or repairing the product; and outputting an indication of the respective set of steps that is associated with the category in which the conversation flow signature is classified, wherein the conversation flow signature encodes graph having a first node that corresponds to a problem domain, a second node that corresponds to a behavior of the product, and at least one edge that leads into the second node, the edge being indicative of a potential cause of the behavior of the product.

10. The system of claim 9, wherein the conversation flow signature is generated by performing Natural Language Processing (NLP) on the set of communications transcripts, and the conversation flow signature identifies a plurality of topics that are discussed in the set of communication transcripts.

11. The system of claim 9, wherein the conversation flow signature is generated by performing Natural Language Processing (NLP) on the set of communications transcripts, and the conversation flow signature identifies a state of the product when a problem belonging to the problem domain is experienced by the product.

12. The system of claim 9, wherein the customer support records are based on: (i) text transcripts of past communications that are associated with past customer support requests, and (ii) records of steps that were recommended to resolve the past customer support requests.

13. The system of claim 9, wherein the at least one processor is further configured to perform the operation of selecting the machine learning classifier out of a plurality of available machine learning classifiers, and the machine learning classifier is selected by performing a search of the plurality of available machine learning classifiers based on an identifier corresponding to the product.

14. The system of claim 9, wherein the machine learning classifier includes at least one of a random forest classifier and/or a neural network.

15. The system of claim 9, wherein the product includes one or more of a computing system, software, a mechanical device, an electronic device, an article of manufacture, and/or an electromechanical device.

16. The system of claim 9, wherein the set of communication transcripts includes one or more communication transcripts, and any of the communications transcripts includes one of a telephone call transcript, a video call transcript, text messages that are transmitted during a chat session, a text of an email, a text of an email thread, a voice message transcript, or a video message transcript.

17. A non-transitory computer-readable medium storing one or more processor-executable instructions, which, when executed by at least one processor, cause the at least one processor to perform the operations of:
generating a conversation flow signature based on a set of communication transcripts, each of the communication transcripts being associated with a support request for a product, each of the communication transcripts being a text transcript of a communication between a respective customer and a respective customer support agent;

classifying the conversation flow signature into one of a plurality of categories, the conversation flow signature being classified by using a machine learning classifier that is trained based on customer support records, each of the plurality of categories corresponding to a respective set of steps for configuring or repairing the product; and outputting an indication of the respective set of steps that is associated with the category in which the conversation flow signature is classified, wherein the conversation flow signature encodes a graph having a first node that corresponds to a problem domain, a second node that corresponds to a behavior of the product and at least one edge that leads into the second node, the edge being indicative of a potential cause of the behavior of the product.

18. The non-transitory computer-readable medium of claim 17, wherein the conversation flow signature is generated by performing Natural Language Processing (NLP) on the set of communications transcripts, and the conversation flow signature identifies a plurality of topics that are discussed in the set of communication transcripts.

* * * * *